(12) United States Patent
Otani

(10) Patent No.: US 6,930,808 B2
(45) Date of Patent: Aug. 16, 2005

(54) IMAGE PROCESSING APPARATUS AND METHOD

(75) Inventor: Atsushi Otani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 850 days.

(21) Appl. No.: 09/747,901

(22) Filed: Dec. 22, 2000

(65) Prior Publication Data

US 2002/0071142 A1 Jun. 13, 2002

(30) Foreign Application Priority Data

Dec. 24, 1999 (JP) .......................................... 11-367744

(51) Int. Cl.$^7$ ............................................... H04N 1/46
(52) U.S. Cl. ...................... 358/515; 358/535; 358/500; 345/550; 348/441; 711/100
(58) Field of Search ................................ 358/515, 500, 358/424, 423, 468, 524, 523, 535, 525, 1.9, 404, 444; 711/100; 345/501, 530

(56) References Cited

U.S. PATENT DOCUMENTS

| | | | | |
|---|---|---|---|---|
| 4,896,146 A | * | 1/1990 | Narumiya | 345/550 |
| 4,918,527 A | * | 4/1990 | Penard et al. | 348/718 |
| 5,781,242 A | * | 7/1998 | Kondo et al. | 348/441 |
| 6,084,692 A | | 7/2000 | Ohtani et al. | |

FOREIGN PATENT DOCUMENTS

| | | |
|---|---|---|
| JP | A05-236254 | 9/1993 |
| JP | A05-328116 | 12/1993 |
| JP | A10-126575 | 5/1998 |
| JP | A10-233898 | 9/1998 |
| JP | A11-234528 | 8/1999 |

OTHER PUBLICATIONS

English abstract of JPA11–234528 (Item A).
English abstract of JPA05–236254 (Item B).
English abstract of JPA10–233898 (Item C).
English abstract of JPA05–328116 (Item D).

* cited by examiner

Primary Examiner—Edward Coles
Assistant Examiner—Heather D. Gibbs
(74) Attorney, Agent, or Firm—Morgan & Finnegan, LLP

(57) ABSTRACT

A buffer memory has a plurality of blocks which are virtually broken up into a matrix pattern. An image processing apparatus has a memory controller for writing R, G, and B image data in the buffer memory in units of lines and in a predetermined color order, and reading out the R, G, and B image data written in the buffer memory. The memory controller switches operation for writing the R, G, and B image data in the blocks that belong to corresponding rows, and operation for writing the R, G, and B image data in the blocks that belong to corresponding columns in units of lines, and reads out old image data from a region of the buffer memory in which new image data are expected to be overwritten before the new image data are overwritten by the write operation.

19 Claims, 8 Drawing Sheets

IMAGE PROCESSING APPARATUS AND METHOD

FIELD OF THE INVENTION

The present invention relates to an image processing apparatus and method for processing a plurality of colors (e.g., R, G, and B) image data which form an image.

BACKGROUND OF THE INVENTION

In, e.g., a conventional facsimile apparatus that can read a color image as an image reading apparatus, R, G, and B light sources are time-divisionally turned on to color-separate a document image, image data of respective color components line-sequentially read by a single read sensor are temporarily stored in buffer memories, a masking process is done in synchronism with data input of the last color B of R, G, and B colors, and a color conversion process (RGB/CMYK conversion process) is done to output data.

However, since the conventional image reading apparatus executes the masking process in synchronism with input (image read) of the last color, the pixel processing rate (image processing speed) in the masking process and subsequent processes must be 3 to 4 times higher than the rate (image read speed) of the input stage, and an apparatus which cannot process data at high speed cannot often fully utilize the performance of the read sensor.

In an image reading apparatus which reads an image by scanning a document such as a book using a hand scanner unit which includes a read sensor and is detachable from the apparatus main body, an image begins to be read in accordance with movement detected by a movement sensor provided to the hand scanner unit. However, when the moving speed is high, read errors occur.

Furthermore, when the processing rate (image processing speed) in the masking process and subsequent processes is set to be high, the performance of the read sensor can be fully utilized, but the circuit scale of an image processor that attains high-speed operations increases.

Hence, a technique that can improve the image read speed without setting a high image processing speed for the masking process and subsequent processes is demanded.

SUMMARY OF THE INVENTION

One aspect of the present invention relates to an image processing apparatus for processing a plurality of colors of image data that form an image, which comprises a buffer memory, a memory controller for writing the plurality of colors of image data in the buffer memory in units of lines and in a predetermined color order, and reading out the plurality of colors image data written in the buffer memory, and an image processor for processing the plurality of colors of image data read out by the memory controller. The buffer memory has a plurality of blocks which are virtually broken up into a matrix pattern. The memory controller switches operation for writing the plurality of colors of image data in the blocks that belong to corresponding rows, and operation for writing the plurality of colors of image data in the blocks that belong to corresponding columns in units of lines, and reads out old image data from a region of the buffer memory in which new image data are expected to be overwritten before the new image are overwritten by the write operation.

According to a preferred embodiment of the present invention, the buffer memory is virtually broken up into rows, the number of which is equal to the number of colors, and rows, the number of which is equal to the number of colors. For example, the plurality of image data include R, G, and B data, and the buffer memory is virtually broken up into 3 rows×3 columns.

According to a preferred embodiment of the present invention, the memory controller writes the image data in each block in turn from a head position thereof, and reads out the image data from the block in turn from the head position thereof.

According to a preferred embodiment of the present invention, the plurality of image data are R, G, and B data, and the image processor generates output image data by simultaneously referring to the R, G, and B data.

According to a preferred embodiment of the present invention, the plurality of image data are R, G, and B data, and the image processor executes a process for converting the R, G, and B data into C, M, Y, and K data, and a masking process.

According to a preferred embodiment of the present invention, the image processor processes the plurality of colors of image data read out by the memory controller within a period which has the same duration as a period in which the memory controller writes the plurality of colors of image data for one line in the buffer memory.

According to a preferred embodiment of the present invention, the apparatus further comprises a read sensor for reading an image in units of lines and in a predetermined color order, and the memory controller writes image data which have been output from the read sensor and have undergone a predetermined process in the buffer memory. According to a preferred embodiment of the present invention, the image processor processes image data for a previous line stored in the buffer memory during a period in which a read sensor reads an image for one line. According to a preferred embodiment of the present invention, the apparatus further comprises an output unit (e.g., a transmitter) for outputting image data processed by the image processor.

Another aspect of the present invention relates to an image processing method for processing a plurality of colors of image data that form an image, which comprises the memory control step of writing the plurality of colors of image data in a buffer memory in units of lines and in a predetermined color order, and reading out the plurality of colors image data written in the buffer memory, and the image processing step of processing the plurality of colors of image data read out in the memory control step. The buffer memory has a plurality of blocks which are virtually broken up into a matrix pattern, and the memory control step includes the step of switching operation for writing the plurality of colors of image data in the blocks that belong to corresponding rows, and operation for writing the plurality of colors of image data in the blocks that belong to corresponding columns in units of lines, and reading out old image data from a region of the buffer memory in which new image data are expected to be overwritten before the new image data are overwritten by the write operation.

Still another aspect of the present invention relates to a memory medium that stores software for processing a plurality of colors of image data that form an image. The software includes the memory control step of writing the plurality of colors of image data in a buffer memory in units of lines and in a predetermined color order, and reading out the plurality of colors image data written in the buffer memory. The buffer memory has a plurality of blocks which are virtually broken up into a matrix pattern, and the memory control step includes the step of switching operation for writing the plurality of colors of image data in the blocks that belong to corresponding rows, and operation for writing the plurality of colors of image data in the blocks that belong to corresponding columns in units of lines, and reading out old image data from a region of the buffer memory in which new image data are expected to be overwritten before the new image data are overwritten by the write operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
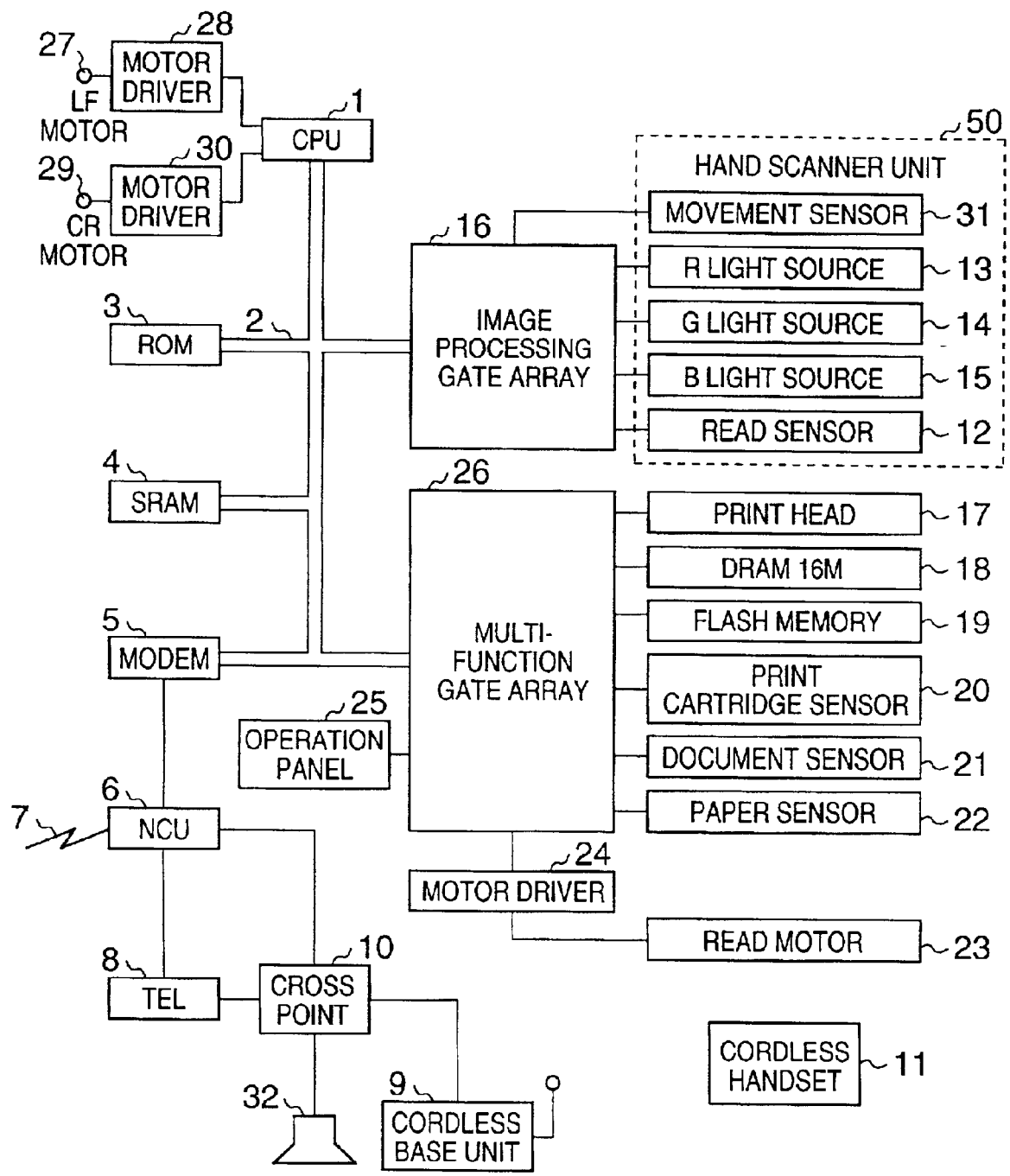
FIG. 1 is a block diagram showing the overall arrangement of an image processing apparatus.

A preferred embodiment of an image processing apparatus and method according to the present invention will be described hereinafter. In this embodiment, the image processing apparatus of the present invention is applied to a facsimile apparatus. FIG. 1 shows the overall arrangement of the image processing apparatus. Referring to FIG. 1, reference numeral 1 denotes a CPU for controlling devices that construct the image processing apparatus. Reference numeral 2 denotes a bus for exchanging data, commands, and the like. Reference numeral 3 denotes a ROM that stores a control program to be executed by the CPU 1.

Reference numeral 4 denotes an SRAM for storing source information, user registration information, and the like. Reference numeral 5 denotes a modem for modulating/demodulating image and audio signals. Reference numeral 6 denotes a network control unit (NCU) for controlling connection between a telephone line and the apparatus of this embodiment. Reference numeral 7 denotes a public telephone line. Reference numeral 8 denotes a wired telephone set.

Reference numeral 9 denotes a base unit of a cordless telephone set. Reference numeral 10 denotes a cross point which selectively connects between the telephone line 7 and telephone set 8 and between the telephone line 7 and base unit 9 of the cordless telephone set. Reference numeral 11 denotes a cordless handset.

Reference numeral 12 denotes a line sensor (read sensor) for reading an image at a resolution of 8 pel in the main scan direction. The read sensor 12 can read image data for one line in the main scan direction. Reference numeral 13 denotes a red LED light source for irradiating a document with red light to read an image by the read sensor 12. Reference numeral 14 denotes a green LED light source for irradiating a document with green light to read an image by the read sensor 12. Reference numeral 15 denotes a blue LED light source for irradiating a document with blue light to read an image by the read sensor 12.

In this embodiment, the read sensor 12, the red LED light source 13, the green LED light source 14, the blue LED light source 15, and a movement sensor 31 are provided to a hand scanner unit 50 detachable from the apparatus main body. This embodiment uses LEDs as the light sources, since the LED light sources allow an easy size reduction of the apparatus, can provide stable light amounts compared to fluorescent lamps and the like, and can be switched at high speed due to their short response time. In this manner, an image forming apparatus having a sheet-through type, high-speed scanner can be provided. Since the consumption current of each LED light source is smaller than that of a fluorescent lamp or the like, the LED light source is suitable for a facsimile apparatus (image forming apparatus) for home use that requires small consumption power.

Reference numeral 16 denotes an image processing gate array (image processor) which executes a shading correction process, a binarization process when a monochrome image is read, a gamma conversion process when a color image is read, a color conversion process for converting R, G, and B colors into Y, M, C, and K colors, a resolution conversion process for converting image data read by the read sensor 12 into a resolution that can be printed by a print head in the main scan direction, ON/OFF control of the LED light source, and the like.

Reference numeral 17 denotes a print head for printing an image. This print head can be freely replaced by either a print head that can print a color image or a print head that can print a monochrome image. The print head of this embodiment is an ink-jet type print head, on the head print surface of which a plurality of nozzles lining up in the sub-scan direction are formed. In the print process, a carriage that mounts the print head is reciprocally moved in the main scan direction perpendicular to the line-up direction of the nozzles, thus forming an image on a region corresponding to the print width of the plurality of nozzles. After that, a print sheet is conveyed in the sub-scan direction by the print width, and the aforementioned print process is repeated, thus forming an image on the print sheet. Note that the ink-jet type print head 17 of this embodiment is of an ink cartridge type (print cartridge) that incorporates an ink tank. The print head is not limited to the ink-jet type but may be of other types such as a thermal transfer type and the like.

Reference numeral 18 denotes a DRAM for temporarily storing image data to be drawn by the print head 17. Reference numeral 19 denotes a flash memory. Reference numeral 20 denotes a print cartridge sensor for detecting the presence/absence and type of a print cartridge. Reference numeral 21 denotes a document sensor for detecting the document width and the presence/absence of a document. Reference numeral 22 denotes a paper sensor for detecting the paper size and the presence/absence of a paper sheet. Reference numeral 23 denotes a read motor for conveying a document. Reference numeral 24 denotes a motor driver for driving the read motor 23.

Reference numeral 25 denotes an operation panel which includes a keyboard and an LCD for displaying the state and the like of the image processing apparatus. On the keyboard, a color copy key for instructing to read a document as a color image and to record the color image, and a monochrome copy key for instructing to read a document as a monochrome image and to record the monochrome image are provided.

Reference numeral 26 denotes a multi-function gate array, to which the aforementioned print head 17, DRAM 18, flash memory 19, various sensors 20, 21, and 22, the motor driver 24 of the read motor 23, operation panel 25, and the like are connected. The multi-function gate array 26 executes a process for converting image data of the main scan direction to that of the sub-scan direction in correspondence with the line-up direction of the nozzles of the print head, a process for converting key input data input from the keyboard of the operation panel 25, and output signals from various sensors into code signals that the CPU 1 can interpret, a timing process of the read motor 23, and the like.

Reference numeral 27 denotes an LF motor for conveying a print sheet in the sub-scan direction. Reference numeral 28 denotes a motor driver for driving the LF motor 27. Reference numeral 29 denotes a CR motor for driving the carriage which mounts the print head 17. Reference numeral 30 denotes a motor driver for driving the CR motor 29. Reference numeral 31 denotes a movement sensor for detecting movement of the hand scanner unit 50 and generating a trigger signal which is used to start an image process, when the hand scanner unit 50 is detached from the apparatus main body and reads a document image. Reference numeral 32 denotes a loudspeaker for audibly informing the user of information such as the state and the like of the image processing apparatus.

Figure 2:
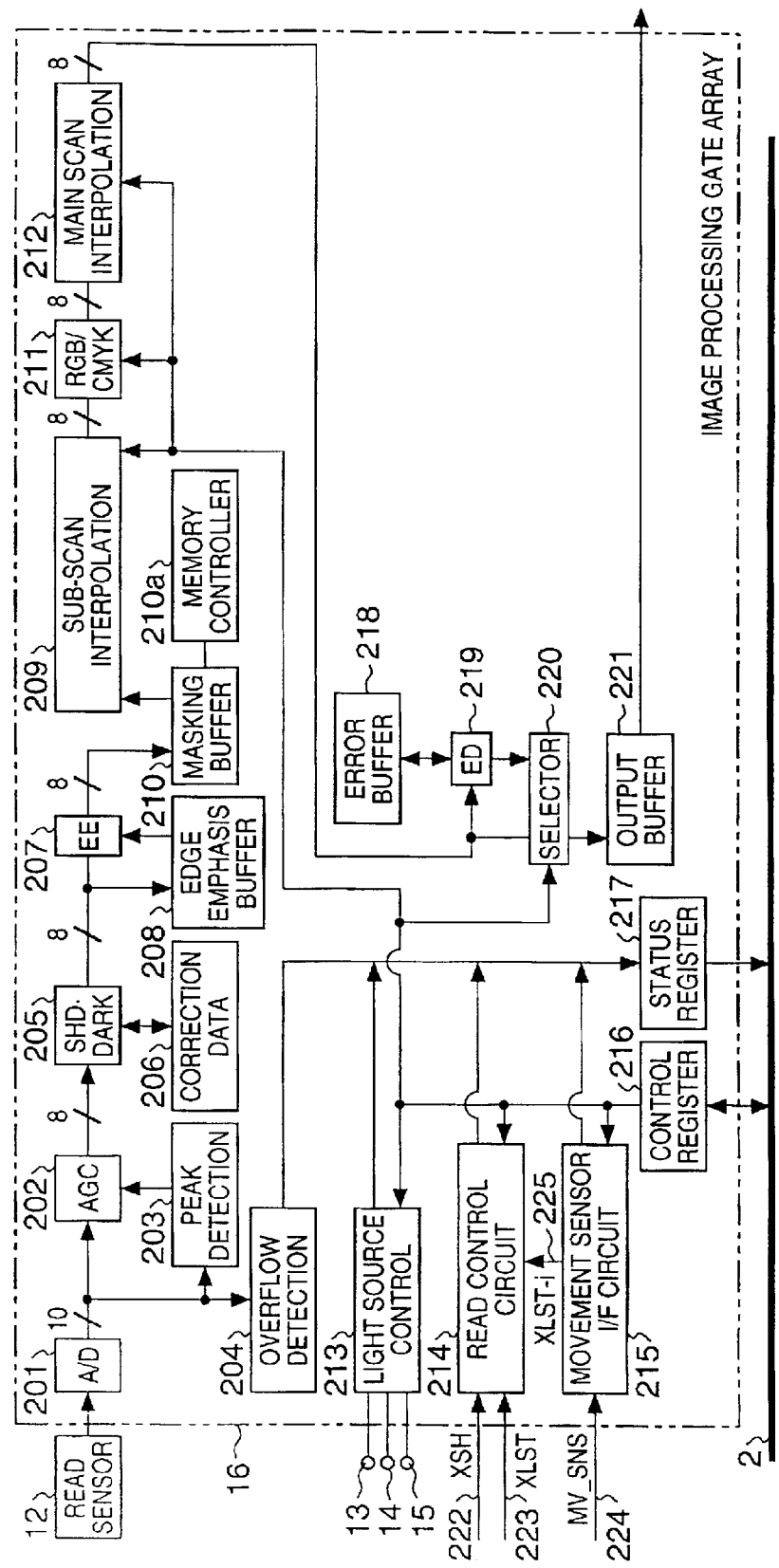
FIG. 2 is a block diagram showing the arrangement of an image processing gate array 16.

FIG. 2 is a block diagram showing the arrangement of the image processing gate array 16. Referring to FIG. 2, reference numeral 201 denotes an A/D conversion circuit for converting the output signal from the read sensor 12 into a 10-bit digital signal. Reference numeral 202 denotes an AGC circuit for selecting 8-bit luminance data in an optimal region from 10-bit luminance data output from the A/D conversion circuit 201 on the basis of the output from a peak detection circuit 203. Reference numeral 203 denotes a peak detection circuit for detecting the peak value of input data upon generating white correction data. Reference numeral 204 denotes a light amount overflow detection circuit for detecting whether or not the output from the A/D conversion circuit 201 overflows due to an excessive light amount.

Reference numeral 205 denotes a shading/black correction circuit for making shading correction and black correction. Reference numeral 206 denotes a correction data memory (e.g., a RAM) for storing correction data for shading correction and black correction obtained by a prescan. Reference numeral 208 denotes an edge emphasis buffer (e.g., a RAM) for temporarily storing data for an edge emphasis process. Reference numeral 207 denotes an edge emphasis processor (EE) for executing an edge emphasis process on the basis of the output from the shading/black correction circuit 205 and the data from the edge emphasis buffer 208.

Reference numeral 210 denotes a masking buffer (e.g., a RAM) for temporarily storing data for a masking process. Reference numeral 210a denotes a memory controller for controlling write/read of image data with respect to the masking buffer 210. Reference numeral 209 denotes a sub-scan interpolation processor for switching in units of lines whether or not interpolation is to be executed, on the basis of image data read out from the masking buffer 210 and a designated value written in a control register 216 by the CPU 1.

Reference numeral 211 denotes an RGB/CMYK conversion circuit for executing a process for converting image signals corrected by the shading/black correction circuit 205 into Y (yellow), M (magenta), C (cyan), and K (black) color signals and a masking operation process in a color process, and executing region discrimination and γ conversion in a monochrome process.

Reference numeral 212 denotes a main scan interpolation unit for converting an image which is read by the read sensor 12 and has a resolution of 8 pel in the main scan direction into a printer resolution of 360 dpi, reducing the read image in size, and masking an unnecessary image.

Reference numeral 213 denotes a light source control circuit for controlling the ON times and currents of the light sources 13, 14, and 15 in accordance with the designated value in the control register 216 and an operation instruction signal from a read control circuit 214, and time-divisionally switching the light sources to be turned on.

Reference numeral 214 denotes a read control circuit for making status control of a read operation in accordance with a sync signal XSH and a read trigger signal XLST or XLST_i. Reference numeral 215 denotes a movement sensor interface circuit for generating a read trigger signal XLST_i in accordance with a movement detection signal MV_SNS output from the movement sensor 31 of the hand scanner unit 50. Reference numeral 216 denotes a control register with which the CPU 1 instructs the image processor (gate array) 16 of operations via the bus 2. Reference numeral 217 denotes a status register with which the CPU 1 monitors the operation state of the image processor (gate array) 16 via the bus 2.

Reference numeral 218 denotes an error buffer (e.g., a RAM) for storing error data upon executing error diffusion. Reference numeral 219 denotes an error diffusion processor (ED) for converting the number of gray levels into data corresponding to an output device by error diffusion. Reference numeral 220 denotes a selector circuit for switching data to be written in an output buffer 221 to data before or after error diffusion. Reference numeral 221 denotes an output buffer (RAM) for temporarily storing image data to be output.

Reference numeral 222 denotes a sync signal XSH which is supplied from a clock generator (not shown) to the read control circuit 214 upon executing a read operation. The signal XSH is used to switch the light source to be turned on, and to synchronize the read operation with the image process. Upon reading a color image, clocks are input to the image processing gate array 16 at 2.5-msec intervals as the sync signal XSH, and the LED light source to be turned on is switched to the red LED light source 13, green LED light source 14, and blue LED light source 15 in turn every time a clock is input. Upon reading a monochrome image, clocks are input at 2.5-msec intervals as the sync signal XSH, and the green LED light source 14 alone is turned on for a required period of time.

Reference numeral 223 denotes a read trigger signal XLST which is issued by the CPU 1 in units of lines. In response to the input read trigger signal XLST, the image processing gate array 16 is activated. Reference numeral 224 denotes a movement detection signal MV_SNS output from the movement sensor 31 of the hand scanner unit 50. When movement of the hand scanner unit 50 is detected upon receiving this signal, the movement sensor I/F circuit 215 issues a read trigger signal XLST_i and writes the moving speed of the hand scanner unit 50 in the status register 217. The CPU 1 detects the moving speed of the hand scanner unit 50 with reference to the status register 217, and writes a designated value that pertains to a sub-scan interpolation process in the control register 216 in correspondence with that moving speed. Reference numeral 225 denotes a read trigger signal XLST_i which is output from the movement sensor I/F circuit 215, and is equivalent to the read trigger signal XLST.

Figure 3:
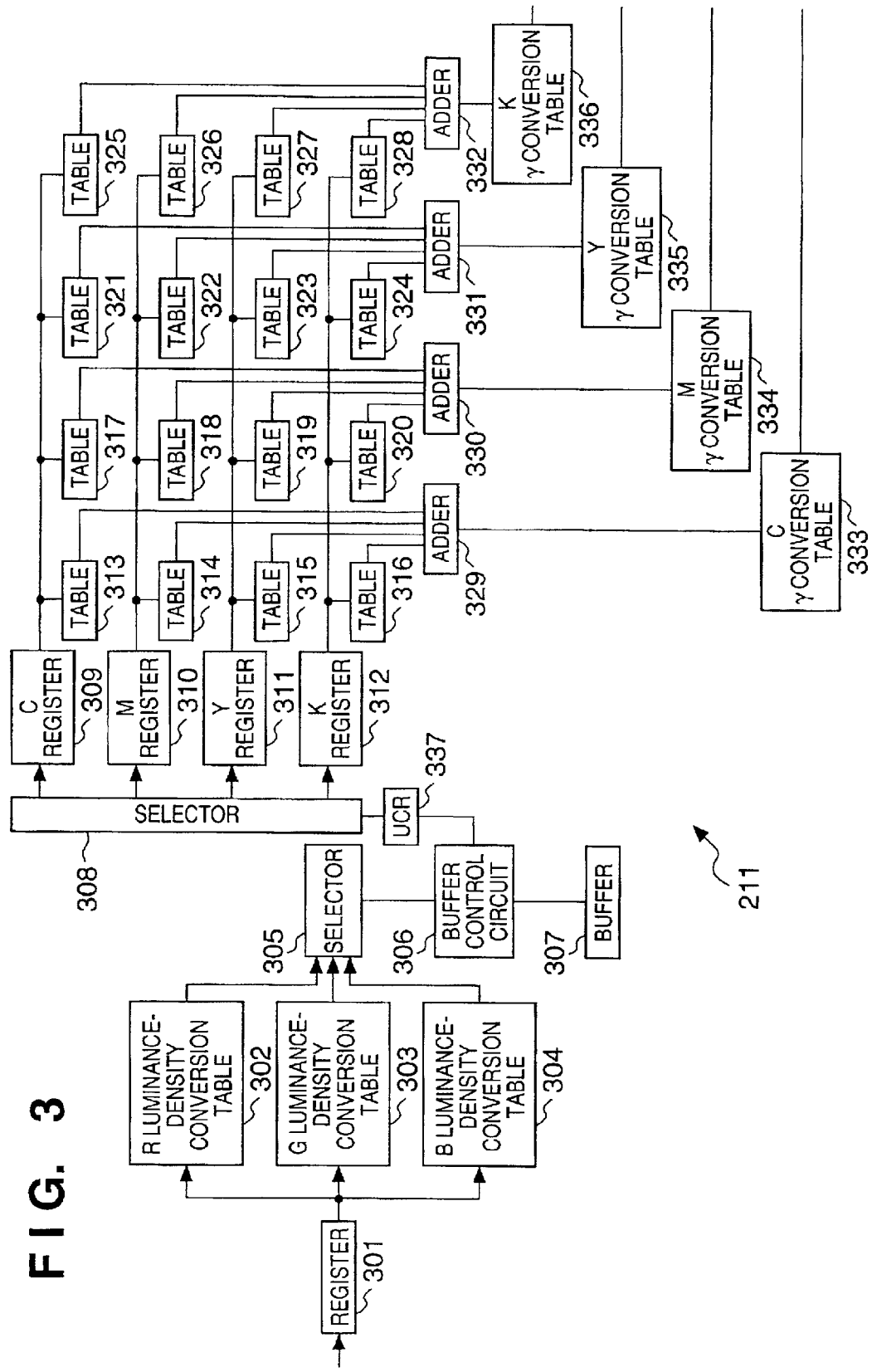
FIG. 3 is a block diagram showing the arrangement of an RGB/CMYK conversion circuit 211 in the image processing gate array 16.

FIG. 3 shows the arrangement of the RGB/CMYK conversion circuit 211 in the image processing gate array 16. Referring to FIG. 3, reference numeral 301 denotes a register for storing pixel-sequentially input Red(R), Green (G), and Blue(B) luminance data for one pixel. Reference numeral 302 denotes a red component luminance-density conversion lookup table RAM which uses the output from the register 301 as an address. Reference numeral 303 denotes a green component luminance-density conversion lookup table RAM which uses the output from the register 301 as an address. Reference numeral 304 denotes a blue component luminance-density conversion lookup table RAM which uses the output from the register 301 as an address.

Reference numeral 305 denotes a selector for selectively outputting the outputs from the lookup table RAMs 302, 303, and 304 in accordance with the input pixel color. Reference numeral 306 denotes a buffer control circuit for controlling write/read of image data with respect to a buffer 307. Reference numeral 307 denotes a delay buffer for synchronizing R, G, and B pixel-sequentially input R, G, and B data.

Reference numeral 309 denotes a register for temporarily storing a cyan (C) component pixel. Reference numeral 310 denotes a register for temporarily storing a magenta (M) component pixel. Reference numeral 311 denotes a register for temporarily storing a yellow (Y) component pixel. Reference numeral 312 denotes a register for temporarily storing a black (K) component pixel. Reference numeral 308 denotes a selector for distributing data read out from the buffer 307 in units of color components and storing the readout data in the registers 309, 310, 311, and 312.

Reference numerals 313 to 328 denote lookup table RAMs for a masking operation, which use the outputs from the registers 309 to 312 as addresses. Reference numeral 329 denotes an adder for adding the outputs from the tables 313 to 316. Reference numeral 330 denotes an adder for adding the outputs from the tables 317 to 320. Reference numeral 331 denotes an adder for adding the output from the tables 321 to 324. Reference numeral 332 denotes an adder for adding the outputs from the tables 325 to 328.

Reference numeral 333 denotes an output γ conversion lookup table RAM for a cyan component, which uses the output from the adder 329 as an address. Reference numeral 334 denotes an output γ conversion lookup table RAM for a magenta component, which uses the output from the adder 330 as an address. Reference numeral 335 denotes an output γ conversion lookup table RAM for a yellow component, which uses the output from the adder 331 as an address. Reference numeral 336 denotes an output γ conversion lookup table RAM for a black component, which uses the output from the adder 332 as an address.

The operation of the RGB/CMYK conversion circuit 211 will be described below. Upon starting a color copy operation, the CPU 1 makes various setups in the image processing gate array 16, and instructs to start a prescan. After that, the CPU 1 generates masking operation tables by multiplying reference data by coefficients in accordance with luminance-density conversion tables and output γ tables stored in the ROM 3, and designated color tone adjustment values, and writes them in the masking operation lookup tables 313 to 328 in the image processing gate array 16.

The masking process is arithmetically described by:

$$\begin{bmatrix} C' \\ M' \\ Y' \\ K' \end{bmatrix} = \begin{bmatrix} A11 & A12 & A13 & A14 \\ A21 & A22 & A23 & A24 \\ A31 & A32 & A33 & A34 \\ A41 & A42 & A43 & A44 \end{bmatrix} \begin{bmatrix} C \\ M \\ Y \\ K \end{bmatrix} \qquad \text{EQ 1}$$

The masking operation lookup table (313 to 328) group includes 16 tables for making the aforementioned arithmetic operation using the reference data.

The table RAM 313 stores a value A11×C (cyan component value: C=0 to 255) as a numerical value, and outputs the arithmetic operation result of A11×C using the input cyan component value as an address. Likewise, the table RAM 314 outputs the arithmetic operation result of A12×M; 315, A13×Y; 316, A14×K; 317, A21×C; 318, A22×M; 319, A23×Y; 320, A24×K; 321, A31×C; 322, A32×M; 323, A33×Y; 324, A34×K; 325, A41×C; 326, A42×M; 327, A43×Y; and 328, A44×K. Note that A11 to A44 are constants.

In the masking operation lookup table, data corrected in accordance with the designated color tone adjustment value is written in place of the reference data itself. Since an actual table is generated by making a correction operation using the reference data, the reference data has higher precision than the actual table and can suppress arithmetic operation result errors. As a bit precision, data stored in each masking operation lookup table consists of 9 bits with a sign, but the reference data consists of 12 bits with a sign.

A method of generating data to be written in each lookup table in accordance with color adjustment will be described below with reference to FIGS. 1 and 3. The operator can adjust the color tone adjustment range via the operation panel 25 and, for example, a value within the range of ±50% (150% to 50%) can be set as the adjustment value for each of C, M, Y, and K colors.

For example, when the adjustment value for a cyan component is set at 110%, the CPU 1 reads out C component data (12-bit table data corresponding to coefficients A11, A21, A31, and A41) as reference data in the ROM 3, generates marking operation data by rounding the arithmetic results obtained by multiplying these data by 110/100 to 9 bits, and writes the generated data in the RAMs 313, 317, 321, and 325.

As for a color for which no adjustment value is designated, after the CPU 1 reads out data in the ROM 3 and rounds 12-bit data to 9-bit data, it writes these data in the corresponding table RAMs. The image processing gate array 16 executes a color conversion process on the basis of the setup data.

The color conversion process will be explained below. Data which are pixel-sequentially input to the RGB/CMYK conversion circuit 312 in the order of R, G, and B are input as addresses of the luminance-density conversion table RAMs 302 to 304 provided in correspondence with R, G, and B components, and are selected and output by the selector 305. Upon executing conversion in units of color components, these data are converted into density signals C, M, and Y.

Data that have passed through the selector 305 are temporarily stored in the buffer 307 so as to undergo a masking process. The buffer 307 has a size capable of storing C, M, and Y pixel data. The C, M, and Y data stored in the buffer 307 are read out therefrom during the input period of the next C, M, and Y data. A UCR circuit 337 generates a K component on the basis of the readout C, M, and Y components, and the C, M, Y, and K components are respectively stored in the registers 309 to 312. Note that the K component is generated using a set threshold value (UCR_T/H) and the input C, M, and Y values under the condition:

when min(C, M, Y)>UCR_T/H:

$$K=\min(C, M, Y)-UCR\_T/H$$

when min(C, M, Y)<UCR_T/H:

$$K=0, C'=C-K, M'=M-K, Y'=Y-K$$

In this case, the K component is subtracted from each of the C, M, and Y components, but the masking operation tables already consider these decrements in practice. In the masking operation given by equation 1, coefficients A*4 (* is a wildcard) are changed as:

A14'=A14−A11−A12−A13
A24'=A24−A21−A22−A23
A34'=A34−A31−A32−A33
A44'=A44−A41−A42−A43

The outputs from the registers 309 to 312 are input to the lookup table RAMs 313 to 328 as addresses, and the adder 329 adds the outputs from the table RAMs 313 to 316. When the arithmetic operation result assumes a negative value, it is clamped to "0"; when the arithmetic operation result is equal to or larger than a value "255", it is clamped to "255", and the result is output as a masking arithmetic operation result of the C component.

Likewise, the adder 330 for the M component adds the outputs from the table RAMs 317 to 320, the adder 331 for the Y component adds the outputs from the table RAMs 321 to 324, and the adder 332 for the K component adds the outputs from the table RAMs 325 to 328, thus outputting the masking arithmetic operation results of M, Y, and K components. The outputs from the adders 329 to 332 are input as addresses of γ conversion RAMs 333 to 336, thus outputting conversion results. The processes in the RGB/CMYK conversion circuit 211 have been explained.

The read operation will be explained below with reference to FIG. 2. When the operator inputs a read operation instruction, the CPU 1 reads out the designated mode and tables corresponding to density setups from table data stored in the ROM 3, and writes data computed based on them in various lookup table RAMs.

A monochrome mode will be explained first. Note that a read operation in the monochrome mode is done in synchronism with sync signals XSH (222) at 2.5-msec intervals.

Before the actual read operation starts, white reference data and dark output data are acquired, and are stored in the correction data memory 206. When the CPU 1 inputs a read trigger signal XLST (223) to the image processing gate array 16, a one line read starts. An analog signal input from the read sensor 12 is quantized to a 10-bit digital signal by the A/D conversion circuit 201, and the 10-bit signal is rounded to 8-bit data by the AGC circuit 202. After the 8-bit data undergoes shading, dark correction, edge emphasis, and sub-scan interpolation, the processed data is input to the RGB/CMYK conversion circuit 211. The masking buffer 210 is used as a buffer for storing sub-scan interpolated data in the monochrome mode.

The RGB/CMYK conversion circuit 211 executes luminance-density conversion and resolution conversion by table conversion using the lookup table RAMs having the input image data as input addresses, and then stores binary data in the DRAM 18.

A color mode will be explained below. A read operation in the color mode is done in synchronism with sync signals XSH (222) at 2.5-msec intervals. Before the actual read operation, white reference data in units of R, G, and B colors, and common dark output data are acquired, and are stored in the correction data memory 206.

When the CPU 1 inputs a read trigger signal XLST (223) to the image processing gate array 16, a one line read of each of R, G, and B colors starts. An analog signal input from the read sensor 12 is quantized to a 10-bit digital signal by the A/D conversion circuit 201, and the 10-bit digital signal is rounded to 8-bit data by the AGC circuit 202. The 8-bit data undergoes shading/dark correction and edge emphasis, and is then input to the RGB/CMYK conversion circuit 211.

The image data is line-sequentially input to the image processing gate array 16 in units of color components. Since the masking processing can not be performed until the data of three color components of each pixel is prepared, the masking buffer 210 also serves as a line-delay buffer.

The RGB/CMYK conversion circuit 211 executes luminance-density conversion, masking arithmetic operations, and output γ conversion by table conversion using the lookup table RAMs having the input image data as input addresses, thus outputting the converted data.

As described above, in the color mode, in order to execute a masking process of line-sequentially input R, G, and B data, since the line data must be temporarily stored, the masking buffer 210 has a data storage size for one line per color, i.e., for a total of three lines. If a batch process is done during the input period of line data of the B component, the buffer size can be reduced to that for two lines, but the processes after RGB/CMYK conversion require a triple or quadruple speed. In this embodiment, processes after RGB/CMYK conversion for the previous line are done during the RGB input period of the next line.

Figure 4A:
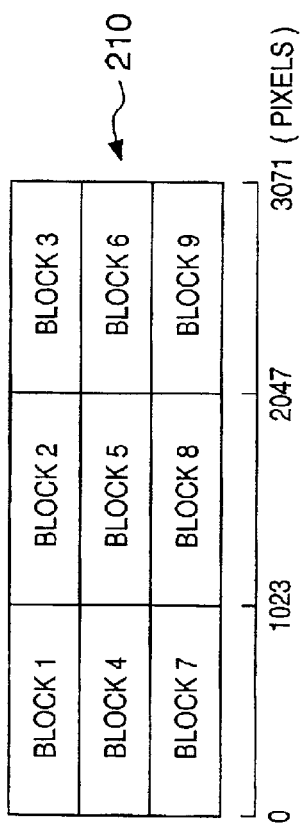
FIGS. 4A and 4B show the arrangement of a masking buffer 210.
Figure 4B:
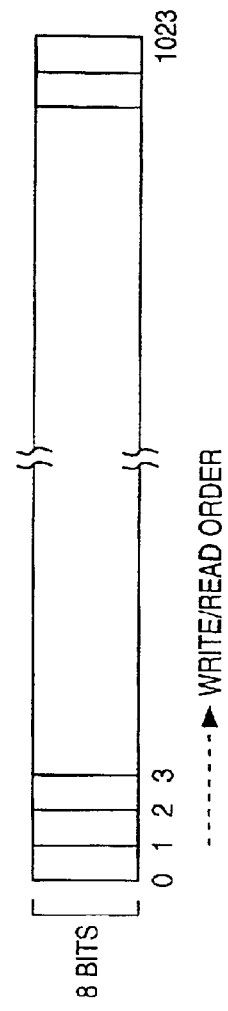

FIG. 4A shows the arrangement of the masking buffer 210. Write and read of image data with respect to the masking buffer 210 are controlled by the memory controller 210 a. Write to the masking buffer 210 is made in units of lines and in the order of R, G, and B colors, and read is made in units of the predetermined number of pixels and in the order of R, G, and B colors. For this reason, if data are simply overwritten on the masking buffer 210, new data are overwritten on data for the previous line before a process for the latter is complete. In order to avoid this, in this embodiment, the memory space of the masking buffer 210 is virtually assigned to a two-dimensional space and is broken up into three rows×three columns, i.e., nine blocks, and the memory controller 210a controls write and read as follows. That is, the memory controller 210a switches operation for writing R, G, and B data for one line in blocks that belong to corresponding rows, and operation for writing R, G, and B data for one line in blocks that belong to the corresponding columns, in units of lines. Also, the memory controller 210a reads out old image data from a region of the masking buffer 210 in which new data are expected to be overwritten before they are actually overwritten by the next write operation.

In this embodiment, each block consists of 1,024×8 bits size and has a size corresponding to 1,024 pixel data. Three blocks have a data size for one line per color, and correspond to a data size of 3,072 pixels (e.g., B 4 size at 300 dpi).

An example of write/read control by the memory controller 210a will be explained below. In the first line formed by R, G, and B data, R data are written in blocks 1, 2, and 3 in this order, G data are written in blocks 4, 5, and 6 in this order, and B data are written in blocks 7, 8, and 9 in this order.

In the second line formed by R, G, and B data, R data are written in blocks 1, 4, and 7 in this order, G data are written in blocks 2, 5, and 8 in this order, and B data are written in blocks 3, 6, and 9 in this order. Before data are overwritten by this write operation, read is made from the first pixel of the previous line (i.e., the first line). That is, before R data are overwritten in blocks 1, 4, and 7 in this order, R, G, and B data of the first line are respectively read out from these blocks, and are supplied to the RGB/CMYK conversion circuit 211 via the sub-scan interpolation processor 209. Also, before G data are overwritten on blocks 2, 5, and 8 in this order, R, G, and B data of the first line are read out from these blocks and are supplied to the RGB/CMYK conversion circuit 211 via the sub-scan interpolation processor 209. Furthermore, before B data are overwritten on blocks 3, 6, and 9 in this order, R, G, and B data of the first line are read out from these blocks and are supplied to the RGB/CMYK conversion circuit 211 via the sub-scan interpolation processor 209.

In the third line formed by R, G, and B data, R data are written in blocks 1, 2, and 3 in this order, G data are written in blocks 4, 5, and 6 in this order, and B data are written in blocks 7, 8, and 9 in this order. Before data are overwritten by this write operation, read is made from the first pixel of the previous line (i.e., the second line). That is, before R data are overwritten on blocks 1, 2, and 3 in this order, R, G, and B data of the second line are respectively read out from these blocks and are supplied to the RGB/CMYK conversion circuit 211 via the sub-scan interpolation processor 209. Also, before G data are overwritten on blocks 4, 5, and 6 in this order, R, G, and B data of the second line are respectively read out from these blocks and are supplied to the RGB/CMYK conversion circuit 211 via the sub-scan interpolation processor 209. Furthermore, before B data are overwritten on blocks 7, 8, and 9 in this order, R, G, and B data of the second line are respectively read out from these blocks and are supplied to the RGB/CMYK conversion circuit 211 via the sub-scan interpolation processor 209.

The same applies to write of the fourth and subsequent lines, and read of the third and subsequent lines.

In this embodiment, the write and read order of 1,024 data in each block are constant, and 0th to 1,023rd pixels are successively read out and written.

In this embodiment, successive data write from the 0th to 1,023rd pixels in each block is done at a speed of, e.g., 1.5M pixels/S, and successive data read from the 0th to 1,023rd pixels written in each block is done at a speed of 1.5M pixels/S (corresponding to 0.5M pixels/S if one pixel is formed by three data, i.e., R, G, and B data).

In this embodiment, the write and read processes start in synchronism with an identical sync signal XSH. However, in order to prevent new data from being overwritten on old data before a read process for the latter, the read process starts 50 µs or more earlier than the write process (for example, 1 XSH in the example shown in FIG. 5).

Data output from the RGB/CMYK conversion circuit 211 undergo resolution conversion in the main scan interpolation unit 212, and are written in the output buffer 221 if they are output as multi-valued level data. On the other hand, if a binarization process is made, data undergo the binarization process in the error diffusion processor (ED) 219, and binary data are written in the output buffer 221. After that, the data are read out from the output buffer 221 and are output. The output buffer 221 has a size for three sets each including C, M, Y, and K data for one line.

Figure 5:
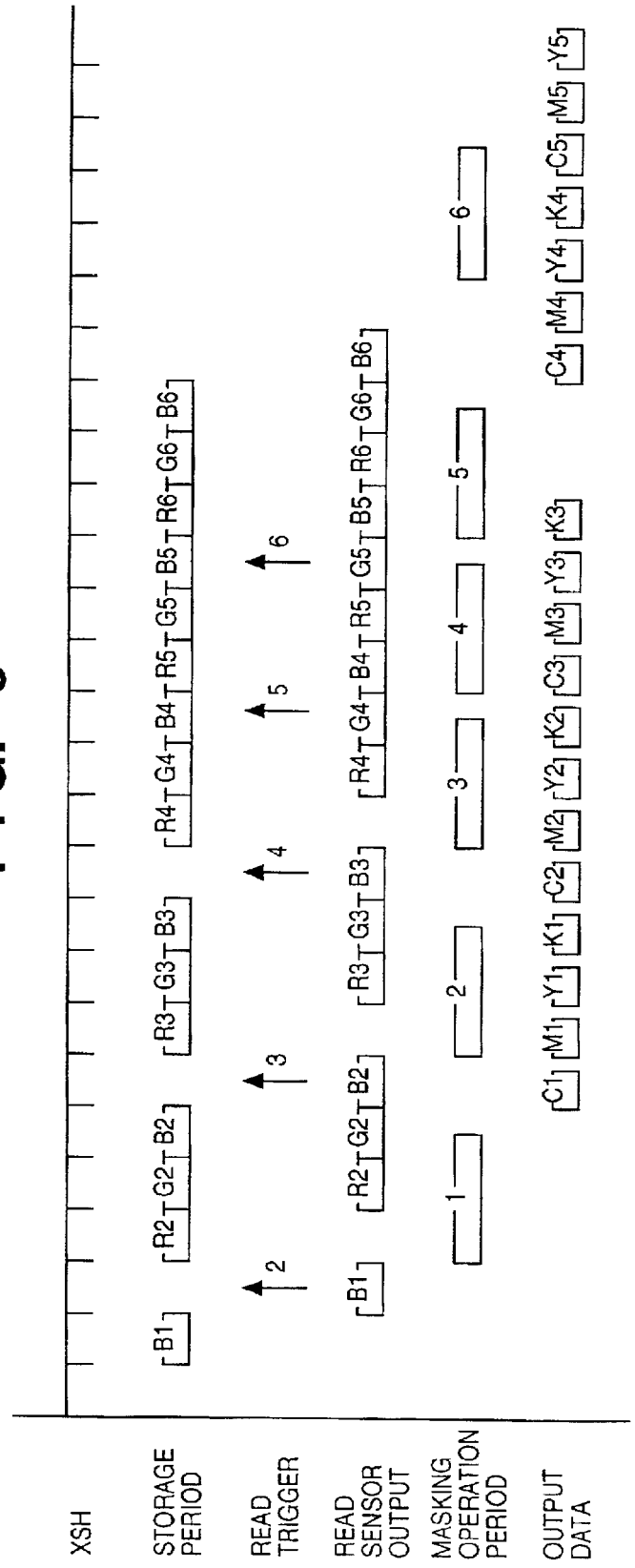
FIG. 5 is a timing chart showing the storage periods of R, G, and B images in a read sensor 12, the read timings of the R, G, and B images from the read sensor 12 (write timings in the masking buffer 210), masking operation periods (read timings from the masking buffer 210), and the output timings of Y, M, C, and K data from an output buffer 221, upon reading a color image.

FIG. 5 shows the timings of the storage periods of R, G, and B images in the read sensor 12, the output periods of R, G, and B images from the read sensor 12 (write to the masking buffer 210), the masking operation period (read from the masking buffer 210), and the output periods of Y, M, C, and K data from the output buffer 221, upon reading a color image. In FIG. 5, the output period of C, M, Y, and K data for one line corresponds to 4×XSH periods (4XSH periods), and the read (storage) period of a document image for one line corresponds to 3×XSH period (3XSH periods). This is to allow easy data handling by line-sequentially outputting data in units of C, M, Y, and K components in synchronism with sync signals XSH.

When the CPU 1 issues a read trigger signal XLST, an image for one line formed by R, G, and B data is stored in the read sensor 12 for the 3XSH periods while switching the LED to be turned on in the order of R, G, and B from the next XSH period, and stored data are output from the read sensor 12 after they are delayed by 1XSH period. R, G, and B data output from the read sensor 12 undergo various processes, and are then written in the masking buffer 210 by the memory controller 210a. The R, G, and B data written in the masking buffer 210 are read out during the next 3XSH periods by the memory controller 210a, and undergo the masking operation process. The masking operation period falls within the 3XSH periods in which images for the next line are stored in the read sensor.

Figure 6:
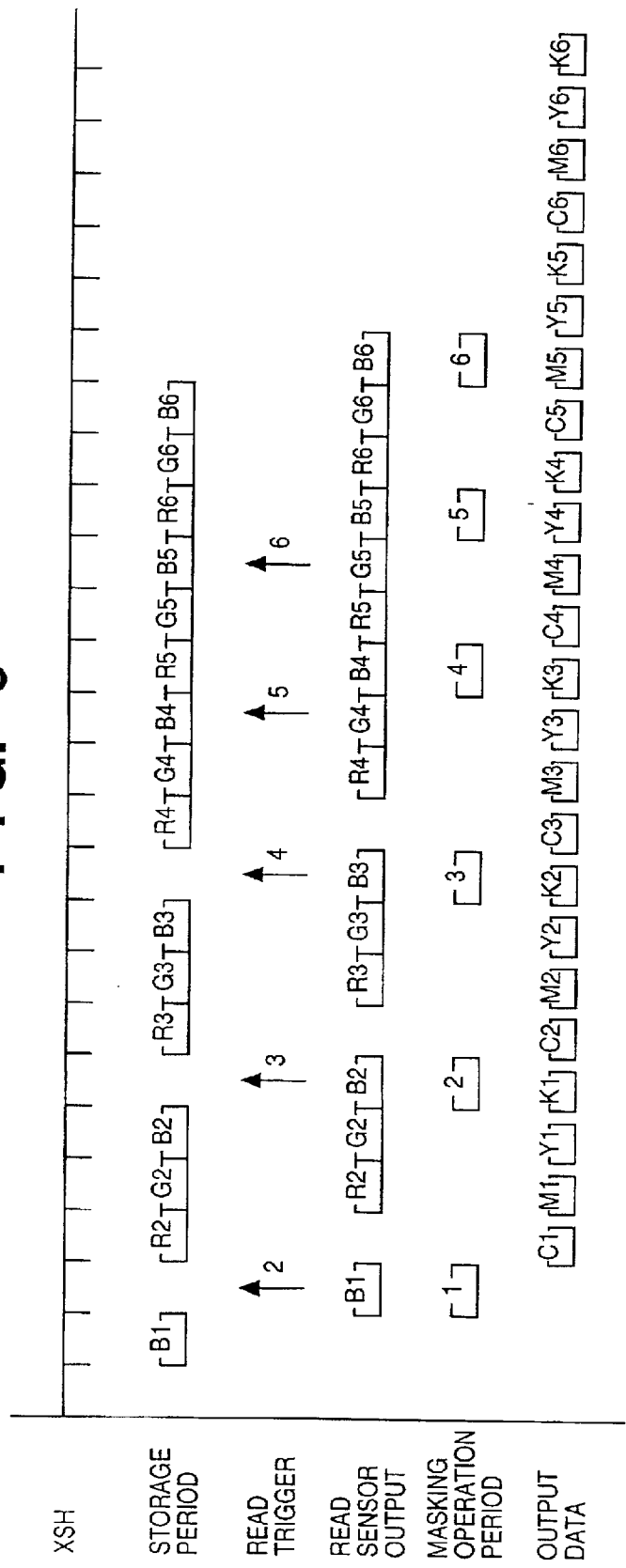
FIG. 6 is a timing chart showing the storage periods of R, G, and B images in a read sensor, the read timings of the R, G, and B images from the read sensor (write timings in a masking buffer), masking operation periods (read timings from the masking buffer), and the output timings of Y, M, C, and K data from an output buffer, upon reading a color image in a conventional apparatus.

FIG. 6 shows the timings of the storage periods of R, G, and B images in a read sensor, the output periods of R, G, and B images from the read sensor (write to a masking buffer), masking arithmetic operations (read from the masking buffer), and the output periods of Y, M, C, and K data from an output buffer, upon reading a color image in the conventional apparatus. When a CPU issues a read trigger signal, an image for one line formed by R, G, and B data is stored in the read sensor during 3XSH periods while switching the LED to be turned on in the order of R, G, and B from the next XSH period, and the stored data are output from the read sensor after they are delayed by 1XSH period. R and G data output from the read sensor undergo various processes, and are written in the masking buffer. The R and G data written in the masking buffer undergo a masking operation process in synchronism with B data supplied from the read sensor via various processing circuits. The masking operation period corresponds to 1XSH period only since the masking operation process is done in synchronism with B data. In this manner, the masking operation processing period is 1XSH period in the prior art, but is prolonged to 3XSH periods in this embodiment.

Figure 7:
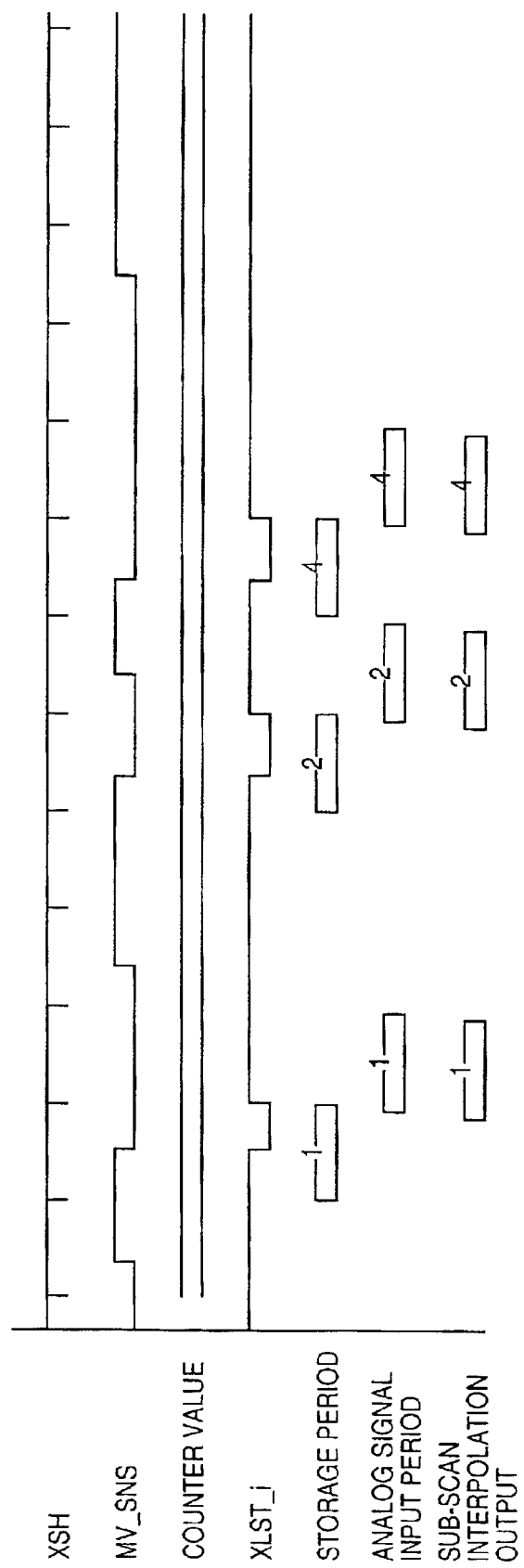
FIG. 7 is a timing chart showing the moving amount of a hand scanner unit and the output timings of a read trigger signal XLST_i in a monochrome mode when the hand scanner unit moves slowly.
Figure 8:
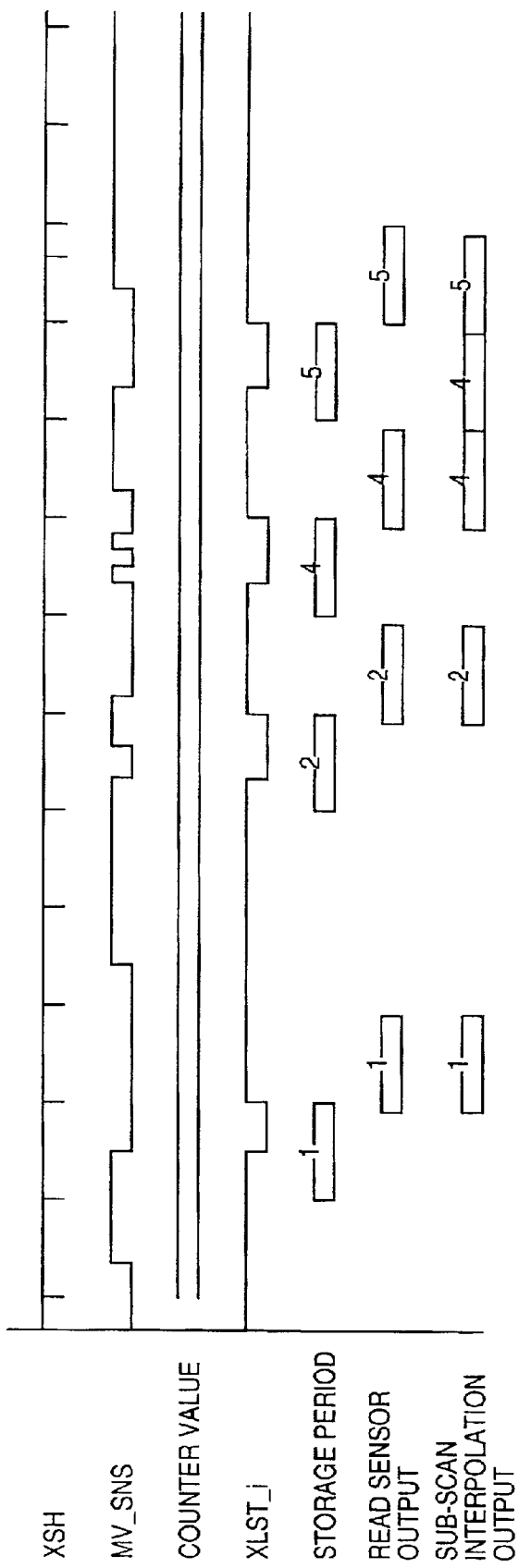
FIG. 8 is a timing chart showing the moving amount of a hand scanner unit and the output timings of a read trigger signal XLST_i in a monochrome mode when the hand scanner unit moves quickly.

Issuance of a read trigger signal XLST_i upon hand scan in the monochrome mode and a sub-scan interpolation process will be explained below. FIGS. 7 and 8 show the moving amount of the hand scanner unit 50 and timings of the read trigger signal XLST_i sub-scan interpolation output in the monochrome mode. This embodiment shows a setup in which read is made once per two inflection points of a movement detection signal MV_SNS from the hand scanner unit 50. FIG. 7 shows a case wherein the hand scanner unit 50 moves slowly, and FIG. 8 shows a case wherein the hand scanner unit 50 moves quickly.

A counter value is obtained by measuring inflection points of the movement detection signal MV_SNS, and can be referred to and set from the CPU 1. The storage time is a period in which the read sensor 12 stores an image. Note that storage operation is done in each XSH period in practice, but FIGS. 7 and 8 show effective data alone. The read sensor output period indicates the timing at which the read data from the read sensor 12 is supplied to the image processing gate array 16. The sub-scan interpolation output indicates the output timing of data from the sub-scan interpolation unit 209 to the RGB/CMYK conversion circuit 211. In FIGS. 7 and 8, numerals assigned to data correspond to individual data.

The count value of inflection points of the movement detection signal MV_SNS output from the movement sensor 31 is compared with a 1-line moving amount Δ, and when the count value is equal to or larger than the 1-line moving amount Δ (in this embodiment, value "2"), a read trigger signal XLST_i is activated, and the read control circuit 214 samples this read trigger signal XLST_i in synchronism with the sync signal XSH.

When the hand scanner unit 50 moves relatively slowly (see FIG. 7), input data and sub-scan interpolation output data have one-to-one correspondence. The moving amount is obtained based on the count value of inflection points of the movement detection signal MV_SNS, and a value "2" is subtracted from the accumulated count value upon issuance of the read trigger signal XLST_i.

On the other hand, when the hand scanner unit 50 moves quickly (see FIG. 8), the read operation cannot often be made in time, and the accumulated value of the counter may become twice or more the predetermined moving amount (in this embodiment, value "2") In such case, data is read out a plurality of times from the masking buffer 210 and undergoes sub-scan interpolation (sub-scan interpolation output "4" in FIG. 8), and the predetermined moving amount×2 is subtracted from the counter value.

Control of the counter value and operation designation of sub-scan interpolation are made by software executed by the CPU 1. When the hand scanner unit 50 moves quickly, some data fail to be read. However, since the data are interpolated based on multi-valued level data, an image can be suppressed from crumpling compared to a case wherein data are interpolated based on binary data. Especially, this embodiment is effective for a halftone image which tends to crumple after data interpolation.

On the other hand, a color image can be processed in the same manner as that upon reading a monochrome image by executing the interpolation process in units of R, G, and B colors.

In the above embodiment, the output buffer 221 has a size corresponding to two sets of C, M, Y, and K line data. When an image is read by the hand scanner unit 50, the allowable read speed is restricted by the output speed, and read errors may occur.

To combat this problem, by increasing the output buffer size, i.e., setting the output buffer size to be equal to or larger than a predetermined value, restriction due to the output speed can be relaxed although the average read speed remains the same, and the allowable instantaneous read speed can be improved. In this manner, any read speed nonuniformity (speed variation) of the hand scanner unit can be absorbed. Note that the predetermined value is preferably set to fall within a range that allows buffering without any read errors even when an image is read at an expected maximum moving speed of the hand scanner unit 50. Such read control using the hand scanner unit can be similarly applied to read of a color image.

In the above embodiment, an image is read in units of lines. However, the present invention can also be applied to a case wherein an image is read in units of a plurality of lines or the predetermined number of pixels.

According to a preferred embodiment of the present invention, a time margin for the masking operation can be assured without increasing the size of the masking buffer 210. This means that the image read period can be shortened and the image read speed can be improved when the masking operation is executed at the same speed as in the prior art. Therefore, the image read speed can be improved without increasing the image processing speed of the masking process and subsequent processes.

By setting the image processing speed to be higher than the output speed and increasing the output buffer memory size, an instantaneous maximum allowable read speed can be improved even when the image output speed remains the same, and image read errors due to read speed nonuniformity (speed variation) can be prevented upon hand scan.

All or some hardware components in the above embodiment may be replaced by software and a CPU.

Either all or some components of the apparatus and method according to the above embodiment can constitute an invention.

The apparatus and its building components in the above embodiment may be practiced as a part of another apparatus or in combination with another apparatus.

The objects of the present invention are also achieved by supplying a storage medium (or recording medium), which records a program code of predetermined software to a system or apparatus. The functions of the above-mentioned embodiments may be implemented not only by executing the readout program code by the computer but also by some or all of actual processing operations executed by an OS (operating system) running on the computer on the basis of an instruction of the program code. Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the function extension card or unit.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
a light source which irradiates an original with a plurality of colors in a time-divisional manner;
an image reading unit which line-sequentially reads the original and outputs a plurality of color components of image data in units of lines while time-divisionally irradiating the original with the plurality of colors using said light source;

a buffer memory; and an image processor which writes the plurality of color components of image data for one line outputted from said image reading unit into said buffer memory, after that during an image reading period of said image reading unit for a next line, reads out the plurality of color components of the image data for the one line from said buffer memory and performs a masking operation on the read out image data for the one line, wherein said buffer memory has a plurality of blocks which are virtually broken up into a matrix pattern, and said image processor switches operation for writing the plurality of color components of image data in the blocks that belong to corresponding rows, and operation for writing the plurality of color components of image data in the blocks that belong to corresponding columns in units of lines, and reads out old image data from a region of said buffer memory in which new image data are expected to be overwritten before the new image are overwritten by the write operation.

2. The apparatus according to claim 1, wherein said buffer memory is virtually broken up into rows, the number of which is equal to the number of colors, and columns, the number of which is equal to the number of colors.

3. The apparatus according claim 2, wherein the plurality of image data include R, G, and B data, and said buffer memory is virtually broken up into 3 rows×3 columns.

4. The apparatus according to claim 1, wherein said image processor writes the image data in each block in turn from a head position thereof, and reads out the image data from the block in turn from the head position thereof.

5. The apparatus according to claim 1, wherein the plurality of image data are R, G, and B data, and said image processor generates output image data by simultaneously referring to the R, G, and B data.

6. The apparatus according to claim 1, wherein the plurality of image data an R, G, and B data, and said image processor executes a process for converting the R, G, and B data into C, M, Y, and K data.

7. The apparatus according to claim 1, wherein said image processor processes the plurality of color components of image data read out from said buffer memory within a period which has the same durations a period in which said image processor writes the plurality of colors of image data for one line in said buffer memory.

8. The apparatus according to claim 1, wherein said image processor writes image data which have been output from said image reading unit and have undergone a predetermined process in said buffer memory.

9. The apparatus according to claim 1, further comprising an output unit for outputting image data processed by said image processor.

10. An image processing method, comprising:

an image reading step of operating an image reading unit to line-sequentially read an original and output a plurality of color components of image data in units of lines while time-divisionally irradiating the original with the plurality of colors; and a processing step of writing the plurality of color components of image data for one line outputted from the image reading unit into a buffer memory, after that, during an image reading period of the image reading unit for a next line, reading out the plurality of color components of the image data for the one line from the buffer memory and performing a masking operation on the read image data for the one line, wherein the buffer memory has a plurality of blocks which are virtually broken up into a matrix pattern, and the processing step includes the step of switching operation for writing the plurality of color components of image data in the blocks that belong to corresponding rows, and operation for writing the plurality of color components of image data in the blocks that belong to corresponding columns in units of lines, and reading out old image data from a region of the buffer memory in which new image data are expected to be overwritten before the new image data are overwritten by the write operation.

11. The method according to claim 10, wherein the buffer memory is virtually broken up into rows, the number of which is equal to the number of colors, and columns, the number of which is equal to the number of colors.

12. The method according to claim 11, wherein the plurality of image data include R, G, and B data, and the buffer memory is virtually broken up into 3 row×3 columns.

13. The method according to claim 10, wherein the processing step includes the step of writing the image data in each block in turn from a head position thereof, and reading out the image data from the block in turn from the head position thereof.

14. The method according to claim 10, wherein the plurality of image data are R, G, and B data, and the processing step includes the step of generating output image data by simultaneously referring to the R, G, and B data.

15. The method according to claim 10, wherein the plurality of image data are R, G, and B data, and the processing step includes the step of executing a process for converting R, G, and B data into C, M, Y, and K data.

16. The method according to claim 10, wherein the processing step includes the step of processing the plurality of colors of image data read out from the buffer memory within a period which has the same duration as a period in which the plurality of colors of image data for one line are written in the buffer memory.

17. The method according to claim 10, wherein the processing step include the step of writing image data which have been output from the image reading unit and have undergone a predetermined process in the buffer memory.

18. The method according to claim 10, further comprising the output step of outputting image data processed in the processing step.

19. A memory medium that stores software for processing a plurality of colors of image data that form an image, said software including:

an image reading step of operating an image reading unit to line-sequentially read out an original and output a plurality of color components of image data in units of lines while time-divisionally irradiating the original with the plurality of colors; and a processing step of writing the plurality of color components of image data for one line outputted from the image reading unit into a buffer memory, after that, during an image reading period of the image reading unit for a next line, reading out the plurality of color components of the image data for the one line from to buffer memory and performing masking operation on the read image data for the one line, wherein the buffer memory has a plurality of blocks which are virtually broken up into a matrix pattern, and the processing step includes the step of switching operation for writing the plurality of color components of image data in the blocks that belong to corresponding rows, and operation for writing the plurality of color components of image data in the blocks that belong to corresponding columns in units of lines, and reading out old image data from a region of the buffer memory in which new image data are expected to be overwritten before the new image data are overwritten by the write operation.

* * * * *

UNITED STATES PATENT AND TRADEMARK OFFICE
CERTIFICATE OF CORRECTION

| | | |
|---|---|---|
| PATENT NO. | : 6,930,808 B2 | |
| APPLICATION NO. | : 09/747901 | |
| DATED | : August 16, 2005 | |
| INVENTOR(S) | : Otani | |

It is certified that error appears in the above-identified patent and that said Letters Patent is hereby corrected as shown below:

In Claim 3 (col. 15, line 28), please replace "according" with --according to--.

In Claim 6 (col. 15, line 40), please replace "data an" with --data are--.

In Claim 7 (col. 15, line 46), please replace "durations" with --duration as--.

In Claim 17 (col. 16, line 43), please replace "include" with --includes--.

In Claim 19 (col. 16, line 62), please replace "from to" with --from the--.

Signed and Sealed this

Seventh Day of August, 2007

JON W. DUDAS
*Director of the United States Patent and Trademark Office*